April 20, 1937.  H. A. ZAGER  2,077,657
ANIMAL TRAP
Filed June 25, 1935

INVENTOR.
Harold A. Zager

Patented Apr. 20, 1937

2,077,657

UNITED STATES PATENT OFFICE 2,077,657

ANIMAL TRAP

Harold A. Zager, Boston, Mass.

Application June 25, 1935, Serial No. 28,297

2 Claims. (Cl. 43—81)

This invention relates to animal traps, and more particularly to traps which may be employed for killing animals, or for entrapping them alive.

Objects of the invention are to provide a trap of simple and economical construction and which will operate efficiently and effectively.

Another object is to provide a trap construction which may be employed either to kill, or to entrap alive, small as well as large animals.

Other objects will be apparent to those skilled in the art to which this invention appertains from the specification and claims, and from the accompanying drawing illustrating a preferred embodiment of the invention, wherein—

Figure 1:
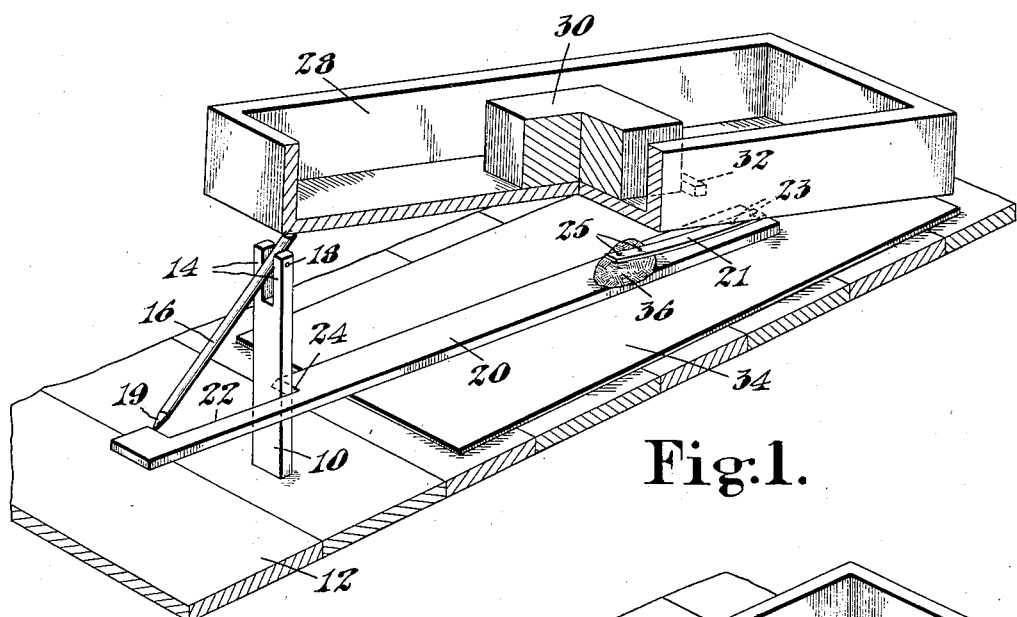
Figure 1 is a perspective view, partly in section, showing the trap in "set" position.

In the drawing I have shown a trap construction particularly arranged to kill small animals, such as mice. The upright member 10 is supported at its lower end on the floor 12, and extends upwardly adjacent to the forward end of the plate or cage member 28. The upper end of the upright member 10 is shaped to provide the bifurcated portions 14 between which the latch 16 is pivotally carried by means of the pin 18. The upper and shorter end of the latch member 16 is provided with a beveled surface 17 and the longer end thereof is shown as pointed at 19 in the manner of a pencil in order to provide a more sensitive latching engagement with the substantially horizontal bait carrying member 20. The member 20 is recessed at 22 to provide the transverse surfaces 24 and 26 for engagement with the upright member 10, and pointed portion 19 of the latch member 16, respectively. In order to render the trap mechanism more sensitive, the surface 24 may be beveled substantially to a knife edge. In order to hold the bait in position, and to prevent an animal from stealing the bait without disturbing the member 20, I have provided a bait-holder 21 consisting of spring metal and secured to the member 20 by suitable fastenings 23. The holder 21 may be provided with detents 25 in order more securely to hold the bait in place.

The plate or cage member 28 is shown in the form of a box so arranged as to kill rather than entrap the animal. A weight 30 is shown located by cleat 32 in a predetermined position within the cage member 28 in order to cause the animal to be struck with greater force when the trap is sprung. A paper 34 may be disposed on the floor beneath the trap for convenience in removing and disposing of a caught animal.

The trap members may be constructed of any suitable materials. From the standpoint of economy and ease of construction, however, I have found it desirable to prepare the upright member 10 from soft wood, and to prepare the latch member 16 and bait carrying member 20 from somewhat harder wood, such as birch or the like. The pin 18 may be of metal, such as iron, coated if desired, with rust-resisting metal, such as copper. It will be obvious, of course, that the trap members may be of any suitable and convenient materials of construction and my invention is in no way limited to the materials from which the various parts are made. The cage member 28 may consist of a wooden or other box or plate and the weight 30 may be of any suitable and convenient material, such as metal or brick. Of course, where the cage member 28 is itself of sufficient weight, the member 30 may be dispensed with.

In operating the trap for the purpose of killing mice and similar small animals the trap members are set up in the manner indicated in Fig. 1. Thus, the member 10 is set in upright position on a paper-covered floor or other suitable surface and the cage member 28 may be supported on the upper end of the latch member 16 while the surface 24 of the horizontal bait carrying member 20 is brought into association with the upright member 10 and the pointed end 19 of the latch member 16 brought into contact with the surface 26. The bait carrying member 20 may be disposed in a position parallel to the floor or may be permitted to incline at its rearward or bait-carrying end to the floor. In assembled position the forward and upper end of the cage member 28 is preferably disposed somewhat rearwardly of the upright member 10, as indicated in Fig. 1.

Figure 2:
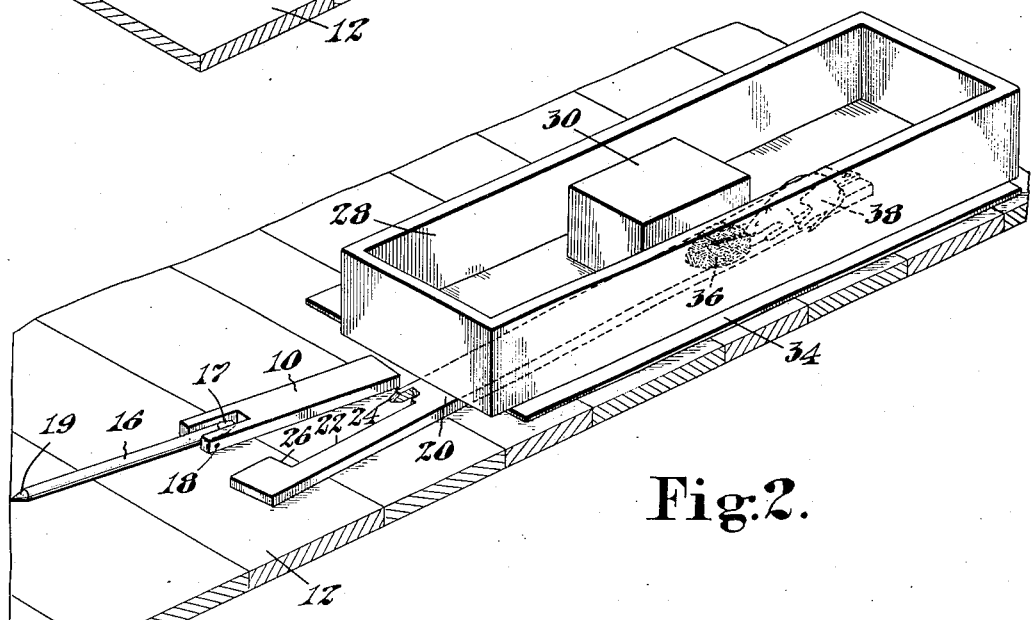
Fig. 2 is a perspective view of the trap after being sprung.
Figure 3:
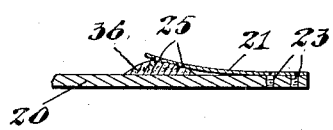
Fig. 3 is a fragmentary vertical section showing the bait positioning and holding device.

The device as shown and described herein is very sensitive and when an animal nibbles at the bait 36 or steps on the bait carrying member 20 the pointed end 19 of the latch member 16 is released from its contact with the surface 26. The weight of the cage member 28 causes it to fall extremely rapidly and to strike and kill the mouse 38 or other animal. When the trap is sprung, the weight of the cage member 28 on the pin 18 causes the upper end thereof to move downwardly and the lower or pointed end thereof to swing upwardly and simultaneously to throw the upright member 10 forwardly and clear of the cage member 28, as indicated in Fig. 2, whereby the upright member 10 and latch member are undamaged by the fall of the plate or cage member 28 and do not interfere with the action thereof.

Various modifications may be made in the trap while still coming within the scope of this invention. Thus, the latch may be pivotally associated with the upright member in any suitable pivoted manner. Moreover, instead of a pencil-pointed end, any suitable shape may be given to the lower end of the latch in order to provide a sensitive contact of the latch with the bait carrying member. Furthermore, the bait carrying member may be shaped in any suitable manner in order to provide surfaces for cooperation with the upright and latch members.

The cage member or plate 28 may be of any suitable type and shape. Thus, where it is desired to kill the animal the member 28 may comprise a weighted box such as shown in the drawing, or any equivalent thereof. Where it is desired to entrap rather than to kill the animal, the plate or cage member 28 may be supported in inverted position.

In the claims, the term "plate" is to be construed sufficiently broadly to cover a plat or weighted member designed to kill the animal, and also a cage or inverted box designed to entrap, rather than to kill, the animal.

It will be noted that by my invention I have provided a trap construction which, while efficient in operation, is very economical in construction and may be made with small cost from inexpensive materials. The trap construction as disclosed furthermore is equally adapted for the killing, or the entrapping, of animals and functions equally well for either purpose.

Having described my invention, what I claim as new and desire to secure by Letters Patent of the United States is:

1. In an animal trap, in combination, a bait-carrying member longitudinally recessed to provide opposed transverse surfaces, means associated with said bait-carrying member to hold bait firmly in position, an upright member arranged to cooperate with one of said transverse surfaces, the transverse portion of the bait-carrying member which cooperates with the upright member being shaped to provide a substantial knife-edge contact therewith, and a latch pivoted between its ends and attached to and carried by said upright member, one end of said latch being pointed and arranged to engage the other transverse surface in sensitive contact, the other end of said latch being arranged to support the upper end of an inclined plate whereby the resulting pressure against said transverse surfaces of the bait-carrying member serves to hold the upright member, latch and bait-carrying member in assembled position until the bait-carrying member is disturbed by an animal.

2. An animal trap comprising, in combination, an upright member arranged to rest on a substantially horizontal supporting surface and composed of relatively soft wood and bifurcated at its upper end, a latch pointed at one end and composed of wood of a hardness approximating that of birch and extending between the bifurcated portions of the upright member, a pin permanently securing said latch intermediate its ends to said bifurcated portions of the upright member and in pivotal relationship thereto, whereby the angular relationship between the latch and upright member may be adjusted without disassociation of said parts, a bait-carrying member having near its forward end a transverse surface facing toward the rear of said member and a second transverse surface nearer the rearward end of said member and facing toward the forward end thereof, said second transverse surface being sharpened to a substantially knife edge to permit sensitive contact with the upright member, means associated with said bait-carrying member to hold bait firmly in position, said bait-carrying member being arranged to extend longitudinally of the trap with the said knife-edged transverse surface thereof in contact with said upright member and with the pointed end of the latch in contact with the rearwardly facing transverse surface of the bait-carrying member, and an inclined plate resting at its rearward end on the supporting surface and resting adjacent its forward end on the upper end of the latch.

HAROLD A. ZAGER.